United States Patent [19]
Takahashi et al.

[11] 4,000,004
[45] Dec. 28, 1976

[54] ELECTRODE FOR ALKALINE STORAGE BATTERY AND METHOD FOR MANUFACTURE THEREOF

[75] Inventors: Sachio Takahashi, Ikeda; Yoshizo Miyake, Toyonaka, both of Japan

[73] Assignee: Agency of Industrial Science & Technology, Tokyo, Japan

[22] Filed: May 20, 1975

[21] Appl. No.: 579,246

Related U.S. Application Data

[62] Division of Ser. No. 406,087, Oct. 11, 1973, abandoned.

[30] Foreign Application Priority Data

Oct. 23, 1972  Japan ............................ 47-106012

[52] U.S. Cl. .................................... 429/10; 429/50
[51] Int. Cl.² .................................... H01M 43/04
[58] Field of Search ............ 136/25, 20, 22, 28–31, 136/24, 34, 75, 101; 252/62.51, 62.56; 29/602, 608, 607; 148/103, 101, 108; 423/594; 335/302

[56] References Cited
UNITED STATES PATENTS

| | | | |
|---|---|---|---|
| 2,188,091 | 1/1940 | Baermann, Jr. | 29/608 |
| 2,647,157 | 7/1953 | Booth | 136/147 |
| 2,661,387 | 12/1953 | Ackermann et al. | 136/25 |
| 2,762,777 | 9/1956 | Went et al. | 423/594 |
| 2,892,248 | 6/1959 | Weber et al. | 29/608 |
| 3,073,728 | 1/1963 | Falk | 148/103 X |
| 3,597,278 | 8/1971 | Von Brimer | 136/136 |

Primary Examiner—Anthony Skapars
Attorney, Agent, or Firm—Oblon, Fisher, Spivak, McClelland & Maier

[57] ABSTRACT

An anode for use in the alkaline storage battery, which anode comprises an iron-electrode incorporating a permanent magnet.

6 Claims, 5 Drawing Figures

ELECTRODE FOR ALKALINE STORAGE BATTERY AND METHOD FOR MANUFACTURE THEREOF

This is a division of application Ser. No. 406,087 filed Oct. 11, 1973, now abandoned.

BACKGROUND OF THE INVENTION

This invention relates to an electrode for use in the alkaline storage battery and to a method for the manufacture thereof. More particularly, this invention relates to improvements in the anode for use in the alkaline storage battery.

In batteries of the type using iron-electrodes such as, for example, Edison battery, there have heretofore been used iron-electrodes which are prepared by filling nickel-made containers called "pockets" with iron powder, graphite powder and a small amount of mercury kneaded with a small amount of aqueous solution of potassium hydroxide. So far as a storage battery using such an iron-electrode is charged and discharged at a relatively low current density, collapse of the electrode rarely occurs. As the current density of charging and discharging increases, however, the iron-electrode collapses or the fragments detached from the iron-electrode give rise to a short circuit, with the result that the charge-discharge cycle of the storage battery is sharply shortened to impair the utility value of the battery.

In order for the iron-electrode to withstand high current density of charging and discharging, it is necessary to decrease the electric resistance as much as possible, increase the mechanical strength and heighten the porosity thereby enlarging the area of solid-liquid interface between the electrode and the electrolyte. Since the aforesaid electrode which has a nickel-made pocket filled with iron powder has limited room for possible improvement in performance, a sintered mass of iron powder in which metal materials for both current collection and reinforcement are imbedded is used as an electrode. Even when such sintered mass is used as an iron-electrode, it is required to have as high porosity as permissible in order that the storage battery may be charged and discharged at a high current density. The increase of porosity entails degradation of mechanical strength and possibility of collapse.

A primary object of this invention is to provide for the alkaline storage battery an electrode which has outstanding durability to high current density of charging and discharging and a method for the manufacture thereof.

SUMMARY OF THE INVENTION

To accomplish the aforementioned object, the anode for the alkaline storage battery according to this invention uses a permanent magnet in combination with an iron-electrode of the conventional type. As a result of the incorporation of the permanent magnet to the iron-electrode, the iron-electrode is magnetized throughout and the magnetic field formed around the iron-electrode manifests strong magnetic force. Thus, the electrode of this invention is not collapsed even when it is exposed to such high current density of charging and discharging as would readily bring forth breakage of the conventional iron-electrode. Consequently, possible detachment of fragments from the electrode is repressed, so that the electrode is hardly deteriorated.

Other objects and other characteristics of the present invention will become apparent from the description of the invention to be given in further detail herein below with reference to the accompanying drawing.

DETAILED DESCRIPTION OF THE INVENTION

Figure 1:
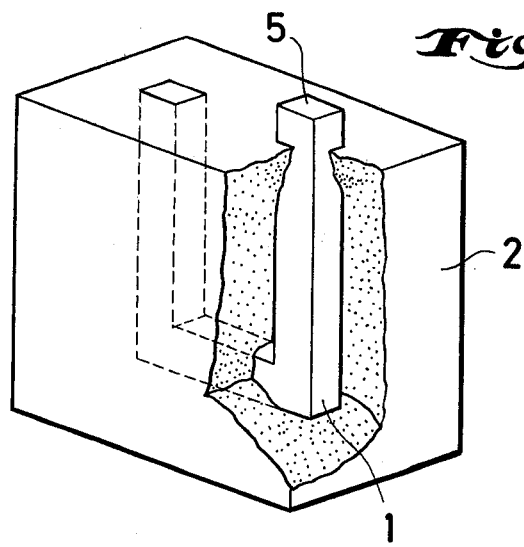
FIG. 1 is a partially cut-away oblique view illustrating one preferred embodiment of the anode for the alkaline storage battery according to the present invention.

The inventors pursued devoted research for the development of an iron-electrode capable of providing stable service in the alkaline storage battery for a long period of time while repressing as much as possible the phenomena of collapse, consumption, etc. resulting from repeated charging and discharging. As a result, they have discovered that, when an iron-electrode is combined with a permanent magnet, then the iron-electrode is magnetized throughout and the magnetic field formed around the iron-electrode manifests strong magnetic force to protect the iron-electrode against collapse and repress detachment of fragments from the iron-electrode. The present invention has been accomplished on the basis of this discovery.

The iron-electrodes to be used for the present invention can be made of the same materials, (for example, iron powder and graphite powder) that have heretofore been used for the manufacture of conventional iron-electrodes. These iron-electrodes may be in the form of electrode plate, sintered mass or mixture of iron powder and binder pressed to a desired shape, etc.

The material for the permanent magnet to be used in combination with the aforementioned iron-electrode has only to satisfy the requirement that it has a high degree of coercive force. Examples of the materials which satisfy this requirement include such steel alloys as chromium steel, tungsten steel, cobalt steel and vanadium steel, aluminum-nickel-cobalt alloys and a sintered mass of extremely fine iron powder. Of the metallic materials enumerated above, aluminum-nickel-cobalt alloys and other similar substances which are susceptible to corrosion by alkaline electrolytes should have their surfaces coated with alkali-resistant films as by nickel plating.

The metallic materials of the aforementioned type having high coercive force may be combined with a material for the iron-electrode and thereafter fabricated to a desired shape and magnetized. Or the metallic material which has been magnetized in advance may be joined fast with the iron-electrode. Otherwise, the metallic material may be joined fast with the iron-electrode and subsequently magnetized.

In the case of an iron-electrode made of sintered mass, the material for the iron-electrode is combined with a metallic material having high coercive force, fabricated to a shape suited to the purpose of application and sintered and the sintered piece is magnetized. A sintered piece of iron powder and a metallic material which has been fabricated in advance may be joined by means of an adhesive agent and thereafter magnetized. Otherwise, a sintered piece of iron powder and a metallic material which has been magnetized in advance may be joined fast with an adhesive agent.

In the case of an iron-electrode of the type called a "pocket", a hollow pocket fabricated of a metallic material is filled with iron powder kneaded with aqueous solution of potassium hydroxide and subsequently magnetized. Otherwise, a hollow pocket fabricated of a metallic material may be magnetized in advance and then filled with iron powder kneaded with aqueous solution of potassium hydroxide.

Further, an iron-electrode may be formed by placing a metal bar having high coercive force at the center of a bag made of fabric of synthetic fiber, fabric of glass fiber or fabric of graphite fiber, packing iron powder around the bar in the bag and thereafter magnetizing the bag. If, in this case, the bag is made of fabric of synthetic fiber or fabric of glass fiber, a separator which would otherwise be required can be dispensed with. Thus, the use of this bag serves the purpose of decreasing both the volume and weight of the storage battery.

In any of the iron-electrodes described above, the metallic material which constitutes part of the electrode concurrently serves as a terminal for current collection. The incorporation of such metallic material, therefore, does not entail a disadvantage that the iron-electrode has an increased weight or volume compared with the conventional countertype.

DESCRIPTION OF THE PREFERRED EMBODIMENT

Preferred embodiments of the electrode according to the present invention will be described with reference to the accompanying drawings.

Referring to FIG. 1, a metallic material 1 having the shape of a right-angled "U" and a high degree of coercive force is used as a core and iron powder 2 is packed around the core to form a shaped article. This shaped article is placed in a furnace and heated to 800°–1200° C to sinter the powder. The sintered mass thus obtained is converted into an iron-electrode by being magnetized in a magnetic field of 10000 – 20000 oersteds. The protruding portion 5 of the iron-electrode of said metallic material 1 is used as a terminal of the electrode.

In this case, an iron-electrode may directly be formed by placing a preparatorily magnetized metallic material 1 as a core in a molding frame, packing iron powder 2 kneaded with a suitable binder around the core in the frame and causing the packed mixture to solidify.

Figure 2:
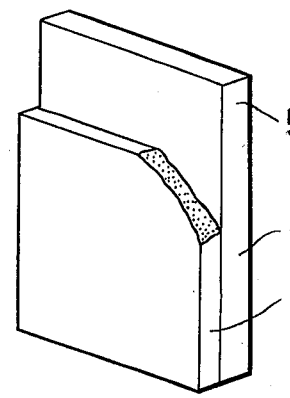
FIGS. 2 through 4 are oblique views illustrating other preferred embodiments of the anode according to this invention.

Referring to FIG. 2, a metallic material 1 of the shape of a plate and a sintered plate 2 of iron powder are joined fast with a suitable adhesive agent and then magnetized to produce an iron-electrode. In this case, the sintered plate 2 of iron powder may be joined with the metallic material which has been magnetized in advance.

Figure 3:
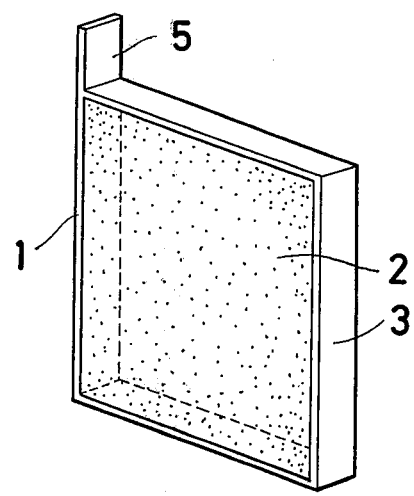

FIG. 3 illustrates an iron-electrode of the shape of a pocket as another preferred embodiment. This iron-electrode is obtained by fabricating a metallic material 1 in the shape of a hollow pocket, packing iron powder 2 kneaded with aqueous solution of potassium hydroxide in the pocket portion 3 and effecting required magnetization. In this case, iron powder may be packed in the metallic material which has been fabricated in the shape of a hollow pocket and magnetized in advance.

Figure 4:
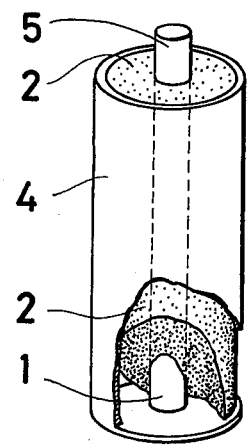

FIG. 4 illustrates an iron-electrode of the type peripherally enclosed with a bag as still another preferred embodiment of the invention. In a bag 4, a metallic material 1 is placed at the center and a material for iron-electrode 2 is packed around said metallic material. Then, the bag 4 is magnetized by means of a magnetizer. Of course, the iron-electrode in this case may be produced by placing a preparatorily magnetized metallic material in the bag and placing the material for iron-electrode around the bag.

Optionally, said magnetization may be effected directly on a storage battery which has been formed by placing the anode according to this invention in conjunction with a conventional cathode in a battery cell and filling the cell with an electrolyte. The shapes of the iron-electrodes shown in the aforementioned drawings are intended solely to illustrate a few preferred embodiments. It goes without saying, therefore, that they may be modified to various shapes to suit the purposes of uses being contemplated.

Iron-electrodes produced as described above can be used as anodes in alkaline storage batteries of the conventional operating principle.

Figure 5:
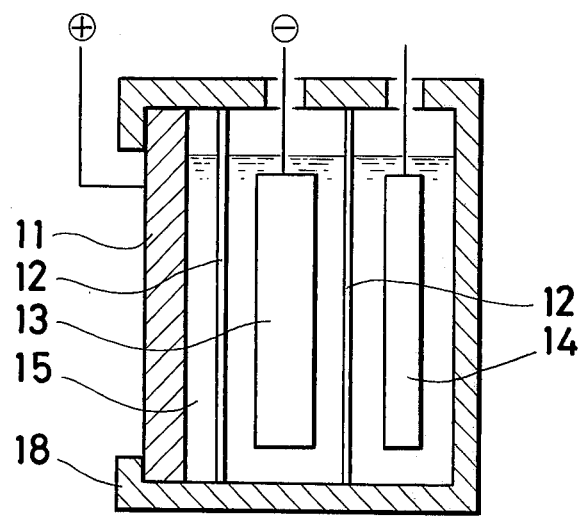
FIGS. 5 and 6 are cross-sectional views of alkaline storage batteries formed by using the anodes according to this invention.

Referring to FIG. 5, a cell 18 of which one side wall constitutes an air electrode 11 is partitioned into three compartments 15, 16 and 17 by inserting two separators in the interior thereof. Then an alkaline storage battery can be constructed by placing an iron-electrode 13 according to this invention in the middle compartment 16 and a charging nickel electrode 14 in the farthest compartment 17 from said air electrode respectively and filling the cell 18 with aqueous solution of potassium hydroxide.

Figure 6:
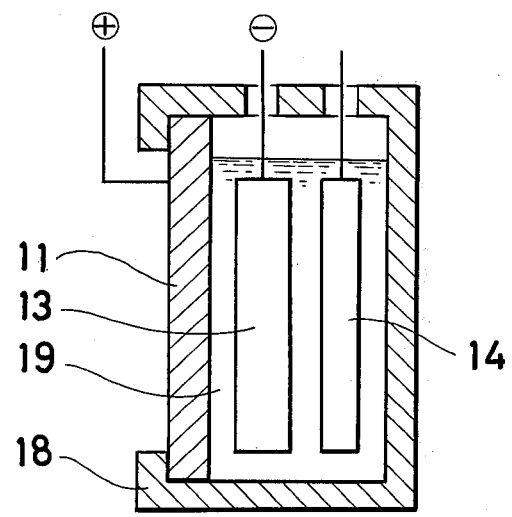

Referring to FIG. 6, a cell 18 contains one side wall which functions as an air electrode 11. An alkaline storage battery can then be constructed by causing an iron-electrode of the type covered with fabric of synthetic resin fiber or glass fiber as illustrated in FIG. 4 to be placed in said cell 18 and a charging nickel electrode 14 to be disposed at a position most separated from said air electrode 11 within said cell and finally filling the cell 18 with aqueous solution of potassium hydroxide. In this case, the fabric of synthetic fiber or glass fiber which covers the iron-electrode 13 plays the part of a separator, rendering use of normal separators unnecessary.

Alkaline storage batteries produced as described above were repeatedly charged and discharged by way of test for their performance. Consequently, it was found that their charge-discharge cycles were by far longer than those of alkaline storage batteries using conventional iron-electrodes, while essentially none of the iron-electrodes were observed to undergo collapse and deformation. A logical explanation is that the iron which functions as a negatively active material has in itself ferromagnetism and the oxide of iron produced in consequence of discharging also has ferromagnetism and, as a consequence, the oxide is strongly attracted to the iron-electrode by the magnetic field of the permanent magnet which the electrode has made to incorporate and prevents the iron-electrode from collapse and deformation.

As described above, the iron-electrode for use in the alkaline storage battery according to this invention can simply be magnetized and, after its magnetism is weakened through repeated charging and discharging, the anode can again be magnetized easily without having to disassembling the battery construction. The charge-discharge cycle of the iron-electrode, therefore, is lengthened to a great extent to add tremendously to the commercial value of the alkaline storage battery.

Now, preferred embodiments of the present invention will be cited herein below. It should be understood that the present invention is not limited in any way to these examples.

EXAMPLE 1

Tungsten steel containing 5% by weight of tungsten and 1% by weight of carbon was fabricated in the shape of a right-angled U and buried in iron powder and then heated to about 1000° C in a hydrogen furnace to have the iron powder sintered. Consequently, there was obtained a porous sintered piece like the one shown in FIG. 1.

Said sintered piece was placed in a magnetizer, wherein it was converted into an iron-electrode by being magnetized in a magnetic field of 12000 oersteds. By combining this iron-electrode with an air electrode obtained by depositing platinum black on a porous substrate of nickel and waterproofing the coated substrate, a charging nickel electrode and a separator formed of synthetic fiber and subsequently introducing as an electrolyte 35% aqueous solution of potassium hydroxide, there was formed an iron-air alkaline storage battery 2 Ah in capacity having a construction like the one shown in FIG. 5. The reason why the charging nickel electrode was incorporated in this battery is that at present, it is not possible to obtain an air electrode capable of withstanding repeated charging and discharging. During the charging, the nickel electrode cooperates with the iron-electrode to effect required charging through the iron-electrode. During the discharging, it cooperates with the air electrode to effect required discharging. Thus, the nickel electrode was adopted as a convenient makeshift.

The alkaline storage battery of the construction described above was subjected to about 250 charge-discharge cycles at a current density of 50 mA/cm$^2$. At the end of this test, the battery showed hardly any discernible degradation of performance.

When said charge-discharged test was repeated at the same current density on a similar alkaline storage battery using an iron-electrode which had been produced by the same procedure except for omission of the step of magnetization, the battery developed a short circuit after about 80 cycles and became unserviceable.

EXAMPLE 2

In a cylindrical bag formed of fabric of glass fiber, a bar of tungsten steel containing 5% by weight of tungsten and 1% by weight of carbon was inserted at the center and iron powder containing 3% by weight of graphite powder mixed therein was packed around said bar. Subsequently, the bag was placed in a magnetizer to have the contents magnetized in a magnetic field of 10000 oersteds. Consequently, there was obtained an iron-electrode of a construction like the one shown in FIG. 4.

An iron-air alkaline storage battery 2 Ah in capacity having a construction like the one shown in FIG. 6 was formed by combining said iron-electrode with an air electrode obtained by depositing platinum black on a porous substrate of nickel and waterproofing the coated substrate and a charging nickel electrode and subsequently introducing as an electrolyte 35% aqueous solution of potassium hydroxide.

This alkaline storage battery was subjected to about 300 charge-discharge cycles at a current density of 20 mA/cm$^2$. At the end of this test, the battery showed hardly any discernible degradation of performance.

When said charge-discharge test was repeated under the same conditions on a similar alkaline storage battery using an iron-electrode which had been produced by the same procedure except for omission of the step of magnetization, the battery developed a short circuit after about 100 cycles and became unserviceable.

EXAMPLE 3

Tungsten steel containing 5% by weight of tungsten and 1% by weight of carbon was fabricated in the shape of a hollow pocket as shown in FIG. 3. The pocket was placed in a magnetizer and magnetized in a magnetic field of 12000 oersteds. Then, a mixture consisting of 96% by weight of iron powder and 4% by weight of graphite powder was kneaded with a small amount of 35% aqueous solution of potassium hydroxide and converted into a pasty state. Said hollow pocket was filled with said pasty mixture to obtain an iron-electrode.

An iron-air alkaline storage battery 2 Ah in capacity was formed by using an iron-electrode as the anode, combining this anode with an air electrode and a charging nickel electrode similarly to Example 1. This storage battery was subjected to about 200 charge-discharge cycles at a current density of 20 mA/cm$^2$. At the end of the test, the battery hardly showed any discernible degradation of performance.

A hollow pocket formed of the same metallic material was filled with the material for iron-electrode and, in its unmagnetized state, subjected to the same charge-discharge test under the same conditions. In this case, the battery developed a short circuit after about 55 cycles and became unserviceable.

We claim:

1. In a method of drawing current from an alkaline storage battery which comprises cyclically charging and discharging said battery, the improvement comprising drawing the current from an alkaline storage battery having a functioning anode which comprises a porous iron electrode in combination with a permanent magnet which is not corroded by the alkaline electrolyte.

2. The method of claim 1, wherein said permanent magnet is selected from the group consisting of chromium steels, tungsten steels, cobalt steels, vanadium steels, aluminum-nickel-cobalt alloys and sintered iron powder.

3. The method of claim 1, wherein said iron-electrode and said permanent magnet are confined in a bag made of fiber.

4. The method of claim 3, wherein said fiber is selected from the group consisting of synthetic fibers, glass fibers and graphite fibers.

5. The method of claim 1, wherein said functioning anode is formed by shaping a metallic material of high coercive force into a structure with the iron-electrode, and thereafter magnetizing said shaped metallic material.

6. The method of claim 5, wherein said shaped metallic material is sintered at 800° – 1200° C and magnetized in a magnetic field of 10,000 – 20,000 oersteds.

* * * * *